(12) United States Patent
Zhang et al.

(10) Patent No.: US 12,038,761 B2
(45) Date of Patent: Jul. 16, 2024

(54) SYSTEMS AND METHODS FOR UPDATING NAVIGATIONAL MAPS

(71) Applicant: TuSimple, Inc., San Diego, CA (US)

(72) Inventors: Bolun Zhang, San Diego, CA (US); Nan Yu, San Diego, CA (US)

(73) Assignee: TuSimple, Inc., San Diego, CA (US)

( * ) Notice: Subject to any disclaimer, the term of this patent is extended or adjusted under 35 U.S.C. 154(b) by 0 days.

(21) Appl. No.: 18/165,627

(22) Filed: Feb. 7, 2023

(65) Prior Publication Data

US 2023/0259143 A1    Aug. 17, 2023

Related U.S. Application Data

(63) Continuation of application No. 17/125,847, filed on Dec. 17, 2020, now Pat. No. 11,579,627.

(51) Int. Cl.
   *G05D 1/02*      (2020.01)
   *G05D 1/00*      (2006.01)
   *G06V 20/56*     (2022.01)
   *G06V 20/58*     (2022.01)
   *H04W 4/46*      (2018.01)

(52) U.S. Cl.
   CPC .......... *G05D 1/028* (2013.01); *G05D 1/0219* (2013.01); *G05D 1/0248* (2013.01); *G05D 1/0257* (2013.01); *G06V 20/582* (2022.01); *G06V 20/588* (2022.01); *H04W 4/46* (2018.02)

(58) Field of Classification Search
   None
   See application file for complete search history.

(56) References Cited

U.S. PATENT DOCUMENTS

2014/0063232 A1*  3/2014  Fairfield .................. B62D 6/00
                                                              382/104
2017/0364090 A1* 12/2017  Grufman .............. G05D 1/0274
(Continued)

FOREIGN PATENT DOCUMENTS

JP         2017067464 A  *  4/2017

OTHER PUBLICATIONS

Machine translation of JP-2017067464-A (Year: 2017).*

*Primary Examiner* — Amelia Vorce
*Assistant Examiner* — Kyle S Park
(74) *Attorney, Agent, or Firm* — Knobbe, Martens, Olson & Bear, LLP

(57) ABSTRACT

Systems and methods for updating navigational maps based using at least one sensor are provided. In one aspect, a control system for an autonomous vehicle, includes a processor and a computer-readable memory configured to cause the processor to: receive output from at least one sensor located on the autonomous vehicle indicative of a driving environment of the autonomous vehicle, retrieve a navigational map used for driving the autonomous vehicle, and detect one or more inconsistencies between the output of the at least one sensor and the navigational map. The computer-readable memory is further configured to cause the processor to: in response to detecting the one or more inconsistencies, trigger mapping of the driving environment based on the output of the at least one sensor, update the navigational map based on the mapped driving environment, and drive the autonomous vehicle using the updated navigational map.

19 Claims, 9 Drawing Sheets

(56) References Cited

U.S. PATENT DOCUMENTS

| | | |
|---|---|---|
| 2018/0188060 A1 | 7/2018 | Wheeler et al. |
| 2018/0307915 A1* | 10/2018 | Olson ................... G05D 1/0231 |
| 2019/0003839 A1 | 1/2019 | Hu et al. |
| 2019/0049990 A1* | 2/2019 | Jafari Tafti ........ G01C 21/3878 |
| 2019/0101924 A1 | 4/2019 | Styler et al. |
| 2019/0138007 A1 | 5/2019 | Baghsorkhi et al. |
| 2019/0204089 A1 | 7/2019 | Rochan Meganathan et al. |
| 2019/0384295 A1 | 12/2019 | Shashua et al. |
| 2020/0184236 A1 | 6/2020 | Aguiar et al. |
| 2020/0191601 A1 | 6/2020 | Jiang et al. |
| 2020/0310450 A1 | 10/2020 | Reschka et al. |
| 2020/0363215 A1 | 11/2020 | Rusignola et al. |
| 2020/0393261 A1* | 12/2020 | Zhang ................... G08G 1/0133 |
| 2020/0408535 A1* | 12/2020 | Fasola ................. G01C 21/3807 |
| 2021/0056712 A1* | 2/2021 | Daudelin ............... G01S 7/4808 |
| 2021/0190512 A1* | 6/2021 | Choi ...................... G06V 20/56 |
| 2021/0331703 A1 | 10/2021 | Duan et al. |
| 2023/0145649 A1* | 5/2023 | Miksa ................ G01C 21/3841 701/24 |

\* cited by examiner

SYSTEMS AND METHODS FOR UPDATING NAVIGATIONAL MAPS

INCORPORATION BY REFERENCE TO ANY PRIORITY APPLICATIONS

This application is a continuation of U.S. patent application Ser. No. 17/125,847, filed Dec. 17, 2020. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

Technological Field

The described technology generally relates to systems and methods for autonomous driving, and more particularly, to updating navigational maps using sensor data.

Description of the Related Technology

In autonomous driving systems, the accurate perception and prediction of the surrounding driving environment and traffic participants are crucial for making correct and safe decisions for control of the autonomous or host vehicle. The driving of an autonomous vehicle may rely on detailed maps to provide sufficiently accurate route information that can be used to select a route for navigation. As modifications are made to the driving environment, navigational maps may become outdated. It may be dangerous to rely on inaccurate navigational maps for autonomous driving. Thus, updating the navigational map based on data received from sensors while driving is desirable to reduce inaccuracies in the navigational maps.

SUMMARY OF CERTAIN INVENTIVE ASPECTS

One inventive aspect is a control system for an autonomous vehicle, comprising: a processor; and a computer-readable memory in communication with the processor and having stored thereon computer-executable instructions to cause the processor to: receive output from at least one sensor located on the autonomous vehicle indicative of a driving environment of the autonomous vehicle, retrieve a navigational map used for driving the autonomous vehicle, detect one or more inconsistencies between the output of the at least one sensor and the navigational map, in response to detecting the one or more inconsistencies, trigger mapping of the driving environment based on the output of the at least one sensor, update the navigational map based on the mapped driving environment, and drive the autonomous vehicle using the updated navigational map.

The detecting of the one or more inconsistencies can be performed using an anomaly detection module and the mapping of the driving environment is performed using a real-time mapping module, and the real-time mapping module can be more computationally intensive than the anomaly detection module.

The triggering of the mapping of the driving environment can be further in response to determining that the number of detected inconsistencies is greater than a threshold number of inconsistencies.

The memory can further have stored thereon computer-executable instructions to cause the processor to: refrain from triggering the mapping of the driving environment in response to the number of detected inconsistencies being less than the threshold number of inconsistencies, and drive the autonomous vehicle using the retrieved navigational map.

The memory can further have stored thereon computer-executable instructions to cause the processor to: detect one or more calibration inconsistencies in the output of the at least one sensor.

The memory can further have stored thereon computer-executable instructions to cause the processor to: determine that the one or more inconsistencies between the output of the at least one sensor and the navigational map are due to the detected one or more calibration inconsistencies, and refrain from triggering mapping of the driving environment in response to the determination that the one or more inconsistencies between the output of the at least one sensor and the navigational map are due to the detected one or more calibration inconsistencies.

The memory can further have stored thereon computer-executable instructions to cause the processor to: determine whether the mapping of the driving environment has generated sufficient new map data for the updating of the navigational map.

The determination of whether the mapping of the driving environment has generated sufficient new map data can comprise: determining a first parameter including a measurement of consistency between the new map data and the navigational map, and determining a second parameter indicative of whether the new map data provides sufficient drivable space for the autonomous vehicle.

The determination of whether the mapping of the driving environment has generated sufficient new map data can comprise: comparing the first parameter to a first parameter threshold, comparing the second parameter to a second parameter threshold, and determining that the mapping of the driving environment has generated sufficient new map data in response to the first parameter being greater than the first parameter threshold and the second parameter being greater than the second parameter threshold.

The determination of whether the mapping of the driving environment has generated sufficient new map data can comprise: determining that the mapping of the driving environment has not generated sufficient new map data in response to at least one of: the first parameter being less than the first parameter threshold and the second parameter being less than the second parameter threshold, and continuing the mapping of the driving environment based on the output of the at least one sensor in response to the determining that the mapping of the driving environment has not generated sufficient new map data.

Another aspect is a non-transitory computer readable storage medium having stored thereon instructions that, when executed, cause at least one computing device to: receive output from at least one sensor located on an autonomous vehicle indicative of a driving environment of the autonomous vehicle; retrieve a navigational map used for driving the autonomous vehicle; detect one or more inconsistencies between the output of the at least one sensor and the navigational map; in response to detecting the one or more inconsistencies, trigger mapping of the driving environment based on the output of the at least one sensor; update the navigational map based on the mapped driving environment; and drive the autonomous vehicle using the updated navigational map.

The updating of the navigational map can comprise: deleting one or more objects from the navigational map that correspond to the one or more inconsistencies.

The non-transitory computer readable storage medium can further have stored thereon instructions that, when executed, cause at least one computing device to: provide the updated map to other autonomous vehicles over the air.

The mapping of the driving environment can comprise: identifying a lane based on the output from the at least one sensor, detecting a ground painting within the lane, and identifying a lane type for the lane based on the ground painting.

The non-transitory computer readable storage medium can further have stored thereon instructions that, when executed, cause at least one computing device to: identify a sign indicative of construction ahead of the autonomous vehicle, and reduce a threshold number of the inconsistencies required to trigger the mapping of the driving environment in response to identifying the sign indicative of construction.

The threshold number of the inconsistencies required to trigger the mapping of the driving environment can be reduced for a predetermined length of time.

Yet another aspect is a method comprising: receiving output from at least one sensor located on an autonomous vehicle indicative of a driving environment of the autonomous vehicle; retrieving a navigational map used for driving the autonomous vehicle; detecting one or more inconsistencies between the output of the at least one sensor and the navigational map; in response to detecting the one or more inconsistencies, triggering mapping of the driving environment based on the output of the at least one sensor; updating the navigational map based on the mapped driving environment; and driving the autonomous vehicle using the updated navigational map.

The method can further comprise: detecting a traffic light based on the output of the at least one sensor, and determining a location of a stopping line based on the detected traffic light.

The at least one sensor can comprise one or more of: a camera, a LIDAR, a global positioning system GPS, and inertial measurement unit (IMU), a RADAR, and a speedometer.

The mapping of the driving environment can comprise one or more of: mapping one or more lanes of a roadway, mapping one or more traffic signs, mapping one or more traffic lights, and mapping one or more ground paintings.

BRIEF DESCRIPTION OF THE DRAWINGS

The patent or application filed contains at least one drawing executed in color. Copies of this patent or patent application publication with color drawings will be provided by the Office upon request and payment of the necessary fee.

DETAILED DESCRIPTION OF CERTAIN INVENTIVE EMBODIMENTS

Introduction to In-Vehicle Control Systems

In the following description, for purposes of explanation, numerous specific details are set forth in order to provide a thorough understanding of the various embodiments. It will be evident, however, to one of ordinary skill in the art that the various embodiments may be practiced without these specific details.

An example embodiment disclosed herein can be used in the context of an in-vehicle control system 150 in a vehicle ecosystem 101. In one example embodiment, an in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described herein can be implemented, configured, and used in a variety of other applications and systems as well.

Figure 1:
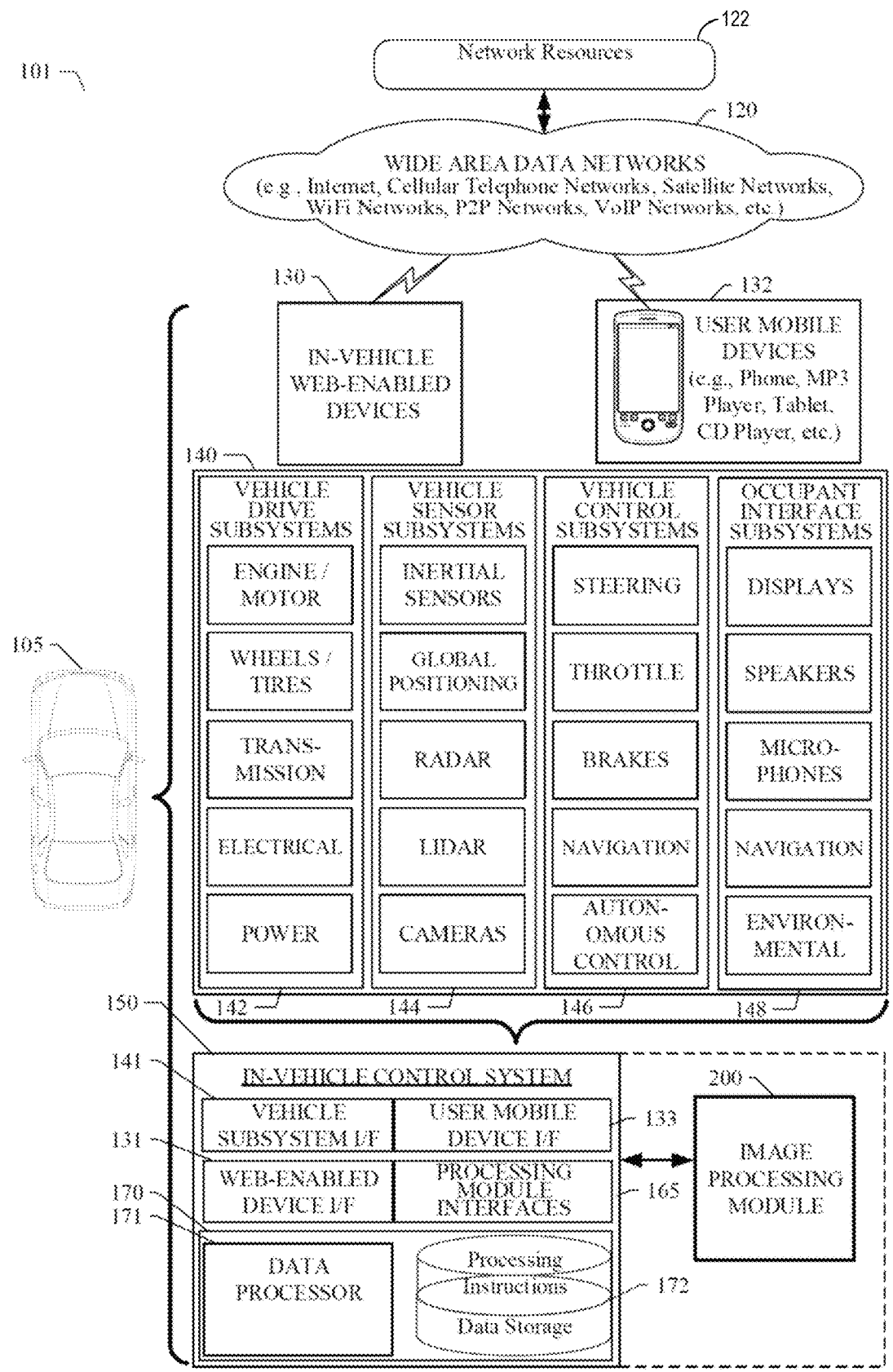
FIG. 1 is a block diagram illustrating an example ecosystem including an in-vehicle control system and an image processing module in accordance with aspects of this disclosure.

With continuing reference to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features (also simply referred to as "objects"), which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle. As used herein, an object may refer to any physical body that can be sensed by the vehicle sensors including, for example, roads, lane markers (e.g., a solid line, dashed line, or other markers on the road), road signs, buildings, traffic cones, other vehicles, pedestrians, bridges, etc.

In an example embodiment as described herein, the in-vehicle control system 150 can be in data communication with a plurality of vehicle subsystems 140, all of which can reside in a user's vehicle 105. A vehicle subsystem interface 141 is provided to facilitate data communication between the in-vehicle control system 150 and the plurality of vehicle subsystems 140. The in-vehicle control system 150 can include a data processor 171 configured to execute the image processing module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

Figure 2:
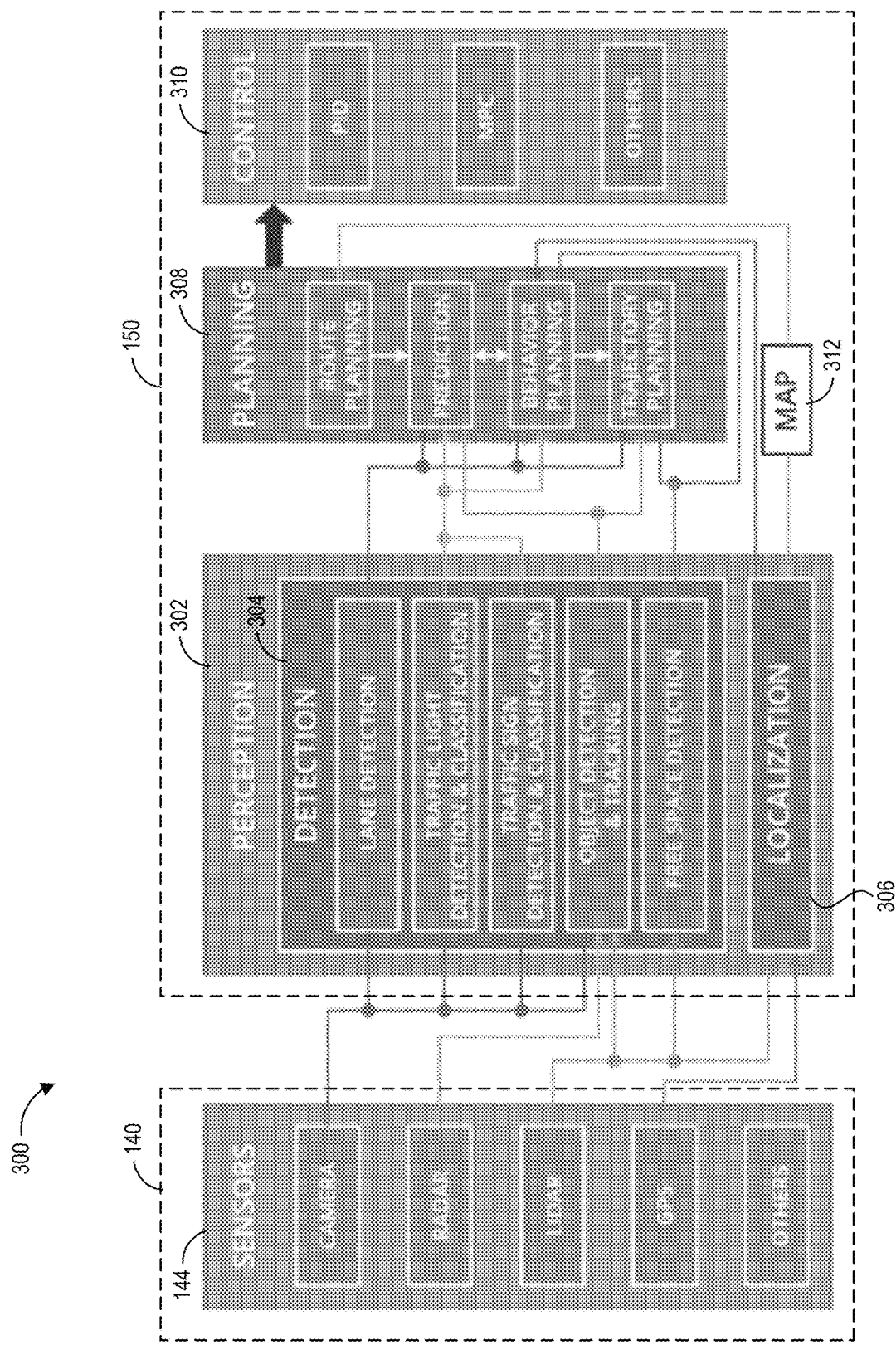
FIG. 2 illustrates an example map update subsystem which can be used to update a navigational map in real time based on sensor data in accordance with aspects of this disclosure.

Although not illustrated in FIG. 1, the network resources 122 may include a map update subsystem 300 (e.g., as shown in FIG. 2), which may include at least some of the components illustrated in FIG. 1. In certain embodiments, the map update subsystem 300 is configured to update the navigational map used by the autonomous vehicle 105 based on data received from one or more sensors, such as the sensors included in vehicle sensor subsystem 144. Further details regarding the subsystem 300 are provided below.

The in-vehicle control system 150 can be configured to receive or transmit data to/from a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The broadcast networks, such as AM/FM radio networks, pager networks, UHF networks, gaming networks, WiFi networks, peer-to-peer networks, Voice over IP (VoIP) networks, and the like are also available. Thus, the in-vehicle control system 150 and the image processing module 200 can receive web-based data or content via an in-vehicle web-enabled device interface 131, which can be used to connect with the in-vehicle web-enabled device receiver 130 and network 120. In this manner, the in-vehicle control system 150 and the image processing module 200 can support a variety of network-connectable in-vehicle devices and systems from within a vehicle 105.

As shown in FIG. 1, the in-vehicle control system 150 and the image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The term wheel may generally refer to a structure comprising a rim configured to be fixedly attached to a tire, which is typically formed of rubber. Optionally, a wheel may include a hubcap attached to an outer surface of the rim or the tire may be exposed to the environment without the inclusion of a hubcap.

The wheels of a given vehicle may represent at least one wheel that is fixedly coupled to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include, or connect to, one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may include an optical sensor that may be embodied as a LIDAR detector or a camera (e.g., a conventional visible wavelength camera). The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit can be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control subsystem 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, capabilities for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide capabilities for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, 4G cellular communication, such as WiMAX or LTE, or 5G cellular communication. Alternatively, the wireless communication system may communicate with a wireless local area network (WLAN), for example, using WIFI®. In some embodiments, the wireless communication system may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control subsystem 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of vehicle 105. In various example embodiments, the in-vehicle control system 150 and the image processing module 200 in data communication therewith can be implemented as integrated components or as separate components. For example, the image processing module 200 can be included as a set of instructions stored in a non-transitory computer readable medium, such as the data storage device 172, for causing the data processor 171 to perform various image processing functionality. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query the user mobile device 132 or a network resource 122 for updates or updates can be pushed to the in-vehicle control system 150.

Systems and Methods for Updating a Navigational Map Based on Sensor Data

In the various example embodiments disclosed herein, a system and method are provided for updating a navigational map, which can be employed in the context of autonomous vehicles 105 in some embodiments. Embodiments of the autonomous vehicle 105 include a semi-truck having a tractor and at least one trailer, an articulated bus, a train, a passenger car, etc.

Autonomous vehicles 105 can use detailed navigational maps in selecting a route between a current location and a destination for navigation. In order to ensure that the autonomous vehicle 105 has sufficient data to navigate through complex road systems, the navigational maps 312 used have a high level of detail including lane level information, speed limit data, static objects on or adjacent to the roadways, etc. High-definition (HD) maps generally refer to a category of navigational maps 312 having sufficient precision for navigation of autonomous vehicles 105. For example, HD maps can define properties of the lanes for all routes in the mapped area with high enough accuracy to be used for lane level navigation.

Autonomous driving may rely heavily on a pre-built navigational map. However, the driving environment in which an autonomous vehicle 105 is driven is not necessarily static. For example, any one of road construction, repainted lines, fallen trees, replaced road signage, etc. can affect the many decisions required to successfully navigate an autonomous vehicle 105. When there are one or more inconsistencies between the navigational map and real-time conditions of the roadway, it may be necessary to halt autonomous driving until a new map update is available. Aspects of this disclosure relate to systems and techniques which can be used to update a navigational map in real-time based on sensor data in order to continue autonomous navigation even when inconsistencies between the navigational map and the driving environment are detected.

FIG. 2 illustrates an example map update subsystem 300 which can be used to update a navigational map in real time based on sensor data in accordance with aspects of this disclosure. As shown in FIG. 2, the map update subsystem 300 includes the vehicle subsystems 140 and the in-vehicle control system 150, which may be similar to those described in connection with the vehicle ecosystem 101 of FIG. 1. As described herein, the map update subsystem 300 can detect and extract high-definition road objects elements using heterogeneous data received from one or more sensors of the vehicle sensor subsystem 144.

In more detail, the vehicle subsystems include the vehicle sensor subsystem 144, which may include one or more sensors, such as a camera, a RADAR, a LIDAR, a GPS, and other sensors. The output of the sensors is provided to the in-vehicle control system 150, which can include a perception module 302, a planning module 308, a control module 310, and a navigational map 312. Although the various modules 302-312 are illustrated as separate blocks in FIG. 2, depending on the implementation, one or more of these modules 302-312 may be combined or split into separate conceptual modules.

The perception module 302 may include a detection module 304 and a localization module 306. In some implementations, the detection module 304 may include a plurality of different modules configured to detect certain objects, signage, conditions, etc. from the driving environment based on the output of one or more of the sensors from the vehicle sensor subsystem 144. For example, the detection module 304 may include a lane detection module, a traffic light detection and classification module, a traffic sign detection and classification module, an object detection and tracking module, and a free space detection module. In some implementations, the lane detection module, the traffic light detection and classification module, the traffic sign detection and classification module, and the object detection and tracking module may receive output from the camera sensor. The object detection and tracking module may also receive output from the RADAR sensor. The object detection and tracking module and the free space detection module may receive output from the LIDAR sensor. However, in some embodiments, the different detection modules may receive output from different set(s) of the sensors from the sensor subsystem in a variety of different combinations.

The localization module 306 may be configured to localize the autonomous vehicle 105 based on output from the GPS sensor and the navigational map received from the navigational map 312.

The planning module 308 may include a route planning module, a prediction module, a behavior planning module, and a trajectory planning module. In this illustrated embodiment, the route planning module may receive the navigational map from the navigational map 312. The prediction module may receive a planned route from the route planning module, output from the behavior planning module, as well as output from each of the lane detection module, the traffic light detection and classification module, and the traffic sign detection and classification module. The behavior planning module may receive output from the prediction module and the trajectory planning module as well as output from the lane detection module, the traffic light detection and classification module, the free space detection module, and the localization module. The trajectory planning module may receive output from the lane detection module, the object detection and tracking module, and the free space detection module.

The control module 310 may be configured to control the autonomous vehicle 105 based on output of the planning module 308. In the illustrated embodiments, the control module 310 may include a proportional-integral-derivative (PID) controller, a model predictive controller (MPC), and other controllers. In some embodiments, the control module 310 may provide instructions to one or more of the subsystems in the vehicle control subsystem 146 to control the autonomous vehicle 105.

As described above, the navigational map may be implemented as an HD map which has sufficient precision for navigation of the autonomous vehicle 105. Due to changes in the driving environment, the navigational map may include errors or other anomalies which are inconsistent with the real-time driving environment of the autonomous vehicle 105.

Figure 3:
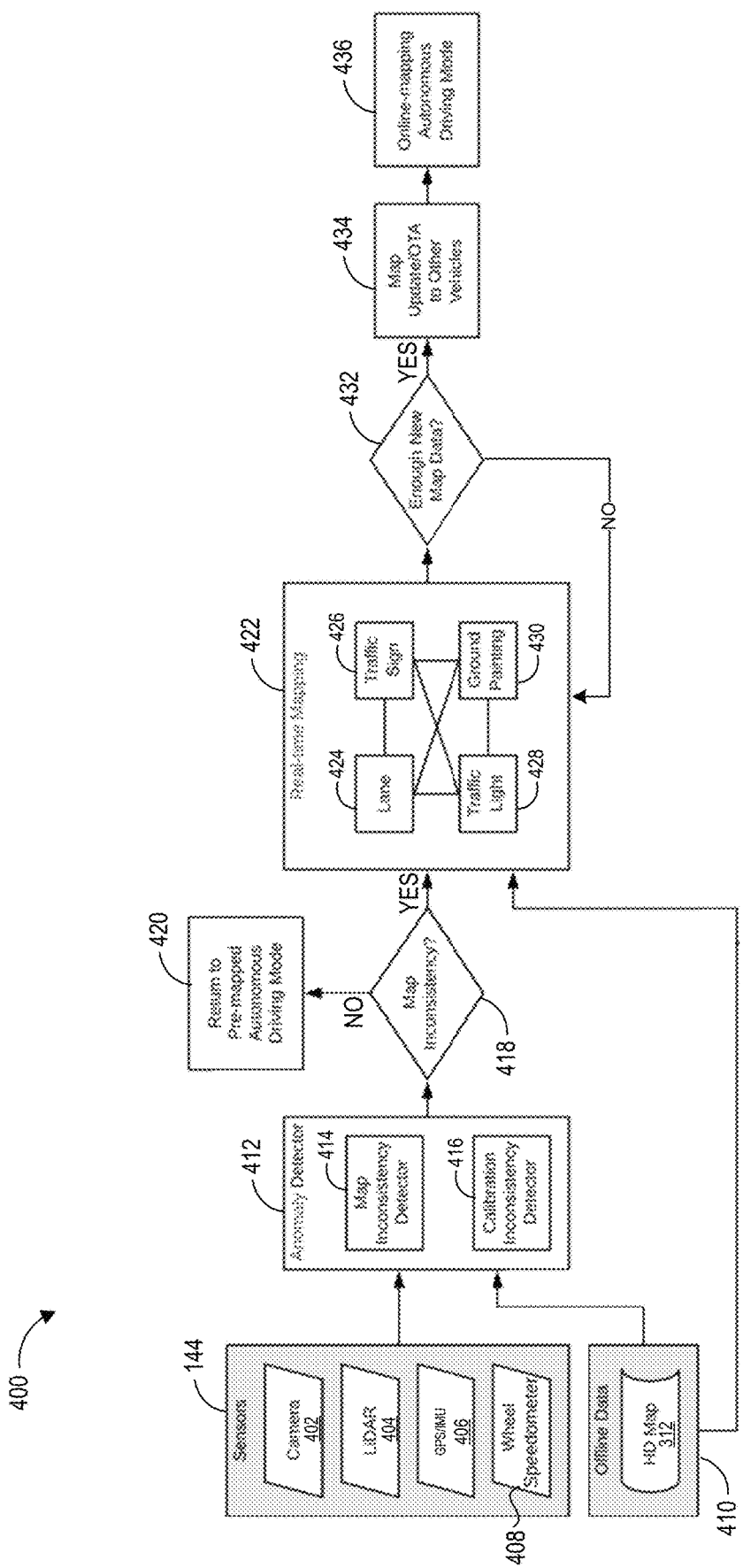
FIG. 3 illustrates an example method or procedure which can be used to detect inconsistencies between the navigational map and the driving environment and update the navigational map in accordance with aspects of this disclosure.

FIG. 3 illustrates an example method or procedure 400 which can be used to detect inconsistencies between the navigational map and the driving environment and update the navigational map in accordance with aspects of this disclosure. One or more blocks of the method 400 may be performed by the map update subsystem 300 and/or another block of the vehicle ecosystem 101.

As shown in FIG. 3, the method 400 may involve an anomaly detector (also referred to as a map monitoring module) 412 detecting an inconsistency in the navigational map. For example, the anomaly detector 412 can receive output data from one or more sensors of the vehicle sensor subsystem 144 and the navigational map from offline data storage 410. In the example of FIG. 3, the sensors of the vehicle sensor subsystem 144 may include the camera 402, the LIDAR 404, the GPS/IMU 406, and a wheel speedometer 408. However, other groups of sensors of the vehicle sensor subsystem 144 can be used, such as any combination of the sensors illustrated in FIGS. 1 and 2. In certain implementations, one or more of the cameras 402 can be angled to look downwards at lanes. The wheel speedometer 408 can be used to assist in localization and road mapping, for example, by using the speed of the autonomous vehicle 105 to determine the distance travelled by the autonomous vehicle 105 form a previously determined location. Another example of a sensor which can be included in the sensors of the vehicle sensor subsystem 144 is a RADAR (not illustrated).

The detection of inconsistencies by the anomaly detector 412 can involve detecting map inconsistencies by a map inconsistency detector 414 and detecting calibration inconsistencies by a calibration inconsistency detector 416. In order to detect inconsistencies, the anomaly detector 412 receives output from the sensors of the vehicle sensor subsystem 144 and the navigational map 312 from the offline data storage 410. In some embodiments, the anomaly detector 412 receives a relevant portion of the navigational map 312 based on output from the GPS 406.

In one example, when data from the navigational map 312 is inconsistent with (e.g., does not match) the data received from one or more of the sensors of the vehicle sensor subsystem 144, the inconsistency could be due to an inconsistency in the navigational system and/or a calibration inconsistency of one or more of the sensors of the vehicle sensor subsystem 144.

An example of a map inconsistency may be the alteration of the driving environment (e.g., a newly painted line on the roadway, etc.) that has not yet been reflected in the navigational map 312.

Another example inconsistency that can be detected by the anomaly detector 412 is a lane anomaly (or lane inconsistency). A lane inconsistency can be detected, for example, by projecting 3D lanes from the navigational map 312 onto 2D images received from the camera 402 to be compared with the 2D lane detection results on the image. When the positions of the lanes from the navigational map 312 and the lane detection do not match (e.g., see FIG. 8), the map inconsistency detector 414 can identify lane inconsistency between the navigational map 312 and the lane detection based on sensor output.

Yet another example inconsistency that can be detected by the anomaly detector 412 is a speed limit anomaly (or speed limit inconsistency). For example, the map inconsistency detector 414 (or another module) can include a module running in the background which can detect traffic signs and recognize speed limits posted on traffic sign. The map inconsistency detector 414 (or another module) can then compare the detected information to the speed limit associated with the current lane in which the autonomous vehicle 105 is positioned as reflected in the navigational map 312. The map inconsistency detector 414 can flag a difference between the detected speed limit and the speed limit stored in the navigational map 312 as a speed limit inconsistency.

The autonomous vehicle 105 may rely heavy on the navigational map 312 in certain implementations to ensure that the autonomous vehicle 105 is driven safely. The localization module 306 can be configured to localize the autonomous vehicle 105 based on lane information contained with the navigational map 312. This can be of particular importance when the autonomous vehicle 105 is a semi-truck hitched to a cargo trailer (e.g., tractor-trailer), since the tractor-trailer is typically wider and longer than a passenger vehicle. For safety reasons, a tractor-trailer should always stay in the lane lines to avoid potential accidents with vehicles in the neighboring lanes. Further, it can be difficult to correct improper positioning of the tractor-trailer within a lane as tractor-trailer tends to zig-zag in response to corrections. The perception module 302 can detect and track the locations of surrounding vehicles with respect to the lane map within the navigational map 312. In addition, the semi-truck hauling the trailer has a longer braking distance compared to passenger vehicles, and thus accurate perception input can vastly improve the ability of the vehicle control subsystem 146 to control the autonomous vehicle 105.

A calibration inconsistency may, for example, affect the measurement of a plurality of objects in the driving environment in a consistent manner such that the detected objects do not match the corresponding objects within the navigational map 312. In certain implementations, the anomaly detector 412 is based on deep/machine learning and fusion of the output of the sensors of the vehicle sensor subsystem 144.

At block 418, the method 400 further involves determining whether there is a threshold number of inconsistencies in the navigational map 312 based on the output of the anomaly detector 412. If the number of inconsistencies detected less is than the threshold number, the method 400 continues at block 420 by returning to driving the autonomous vehicle 105 using the navigational map 312 stored in the offline data storage 410. The method 400 may continuously detect whether there are any anomalies in the navigational map 312 while driving of the autonomous vehicle continues.

In response to the number of detected inconsistencies being greater than the threshold number, the method 400 continues at block 422 at which the map update subsystem 300 performs real-time mapping 422. The real-time mapping block 422 may involve mapping the location of one or more objects detected by the sensors of the vehicle sensor subsystem 144 in order to update the navigational map 312. In the illustrated embodiments, the real-time mapping block 422 includes subblocks for lane mapping 424, traffic sign mapping 426, traffic light mapping 428, and ground painting mapping 430. Depending on the implementation, the real-time mapping block 422 may include additional subblocks for mapping other object(s) detected by the sensors of the vehicle sensor subsystem 144 which can be included in the navigational map 312.

The real-time mapping block 422 may be comparatively computationally intensive compared to the anomaly detector block 412. Thus, by refraining from executing the real-time mapping block 422 when no anomalies are detected, the method 400 is able to conserve processing resources and execute the real-time mapping processes 422 when necessary for autonomous navigation (e.g., when a detected inconsistency may affect the ability of the autonomous vehicle 105 to continue autonomous navigation).

As previously described, an example inconsistency that can be detected by the map inconsistency detector 414 is a lane inconsistency. For example, at a local intersection if there are newly repainted or unclear lane lines, the anomaly detection module 414 will output lane inconsistency information and activate the real-time mapping module 422 via block 418. Based on the navigational map 312, the real-time mapping module 422 can know that the autonomous vehicle 105 is located at an intersection. As a result, the real-time mapping module 422 may implement both the lane mapping module 424 and the traffic light mapping module 428. The lane mapping module 424 will map any new lane lines based on sensor output and the traffic light mapping module 428 will map any new traffic lights detected based on sensor output. In determining whether the sensor output is indicative of new or previously mapped lanes/lights, the sensor output can be compared to the objects represented within the navigational map 312 to determine whether the objects present at the intersection are new or remain unchanged.

At block 432, the method 400 involves determining whether the real-time mapping 422 has generated sufficient new map data to update the navigational map 312. For example, in some implementations, block 432 may involve determining two parameters which may be indicative of whether sufficient new map data has been generated. The first parameter may include a measurement of the consistency between the new map data and the navigational map 312, which may be considered a "sanity check." For example, when lanes are repainted for a construction area, a newly painted lane may not connect directly to the previous lines painted on the roadway represented within the navigational map 312. The map update subsystem 300 can be configured to determine whether the newly mapped lane is swirled below a certain threshold in determining the first parameter. In another example, the navigational map 312 may detect a new speed limit sign having a value that is different from the speed limit stored in the navigational map 312. If the lane module 424 has determined that the inconsistencies are due to construction, the map update system 300 can determine if the new speed limit value is reasonable. The map update system 300 may determine the first parameter as a measurement of how consistent the new map data is with the map data from the navigational map 312.

The second parameter may be indicative of whether the new map data provides sufficient drivable space for the autonomous vehicle 105 to navigate through the newly mapped area. For example, when driving on a highway, the autonomous vehicle 105 can be navigated through the newly mapped area straight along a lane on the highway. Thus, when driving on the highway, the second parameter may be indicative of whether a newly mapped lane is continuous and wide enough for the autonomous vehicle 105. In another example, the route for the autonomous vehicle 105 may include exiting a ramp, however, the lanes from the new map data may be inconsistent with the navigational map 312. In this situation, the map update system 300 can check to see if any highway signs detected by the real-time mapping 422 block indicate that the exit is still in service. The map update system 300 can then determine whether new lanes from the new map data can lead to a possible path to the exit. In this situation, the second parameter may be indicative of whether the autonomous vehicle is able to follow the route to the exit.

In summary, the map update system 300 can determine whether sufficient new map data has been generated based on the first and second parameters. For example, in certain implementations, the map update system 300 determines that sufficient new map data has been generated in response to each of the first parameter and the second parameter being greater than a corresponding threshold value. If the new map data generated is insufficient to update the navigational map 312, the method 400 may return to block 422. If the new map data generated is sufficient to update the navigational map 312, the method 400 may continue at block 434.

The map update system 300 can continue to perform real-time mapping at block 422 until there are sufficient data to update the map as determined in block 432. In certain implementations, the map update system 300 can continuously run the anomaly detector 412 in the background. If the anomaly detector 412 indicates that the previously detected inconsistencies are no longer present, such as the autonomous vehicle exiting a construction area, the map update system can deactivate the real-time mapping block 422. In certain implementations, when the map cannot be updated due to insufficient new map data, the map update system 300 can generate a minimum risk conditions (MRC) signal.

At block 434, the method 400 involves updating the navigational map 312. For example, the navigational map 312 may be updated to delete the objects that correspond to the inconsistencies in block 412 and add in the new objects detected by the real-time mapping block 422. In some embodiments, the updated navigational map 312 may be provided to a navigational map database (not illustrated) so that the updated navigational map 312 can be used by other autonomous vehicles 105. In some embodiments, the updated navigational map 312 can be provided to the navigational map database and/or the other autonomous vehicles 105 over the air (OTA). At block 436, the method 400 involves driving the autonomous vehicle 105 using the updated navigational map 312.

As described above, the method 400 can be separated into at least two parts in the pipeline: (i) detection via the anomaly detector 412 which can be based on deep/machine learning and sensor fusion, and (ii) parameter extraction via the real-time mapping block 422 which extracts road objects enclosing semantic, geometric, and geographic information from time-series. In summary, the anomaly detector 412 can be configured to load the navigational map 312 and detect inconsistencies between objects in the roadway identified based on the sensor output and the navigational map 312 including lane, line, road pattern, traffic sign, and/or traffic light objects. The real-time mapping module 422 can be configured to iteratively extract and infer road objects from real-time collected sensor output when the map monitoring module 412 detects one or more inconsistencies. In one example, highway road signs (see FIG. 6) can provide information on how road lanes form/divide. Ground painting on the road such as bicycle lane signs (see FIG. 4) can provide information on road lanes can be classified. When this type of information is combined with information from the navigational map 312, the navigational map 312 can be updated in real-time such that the autonomous vehicle 105 can be driven using the updated navigational map 312.

Figure 4:
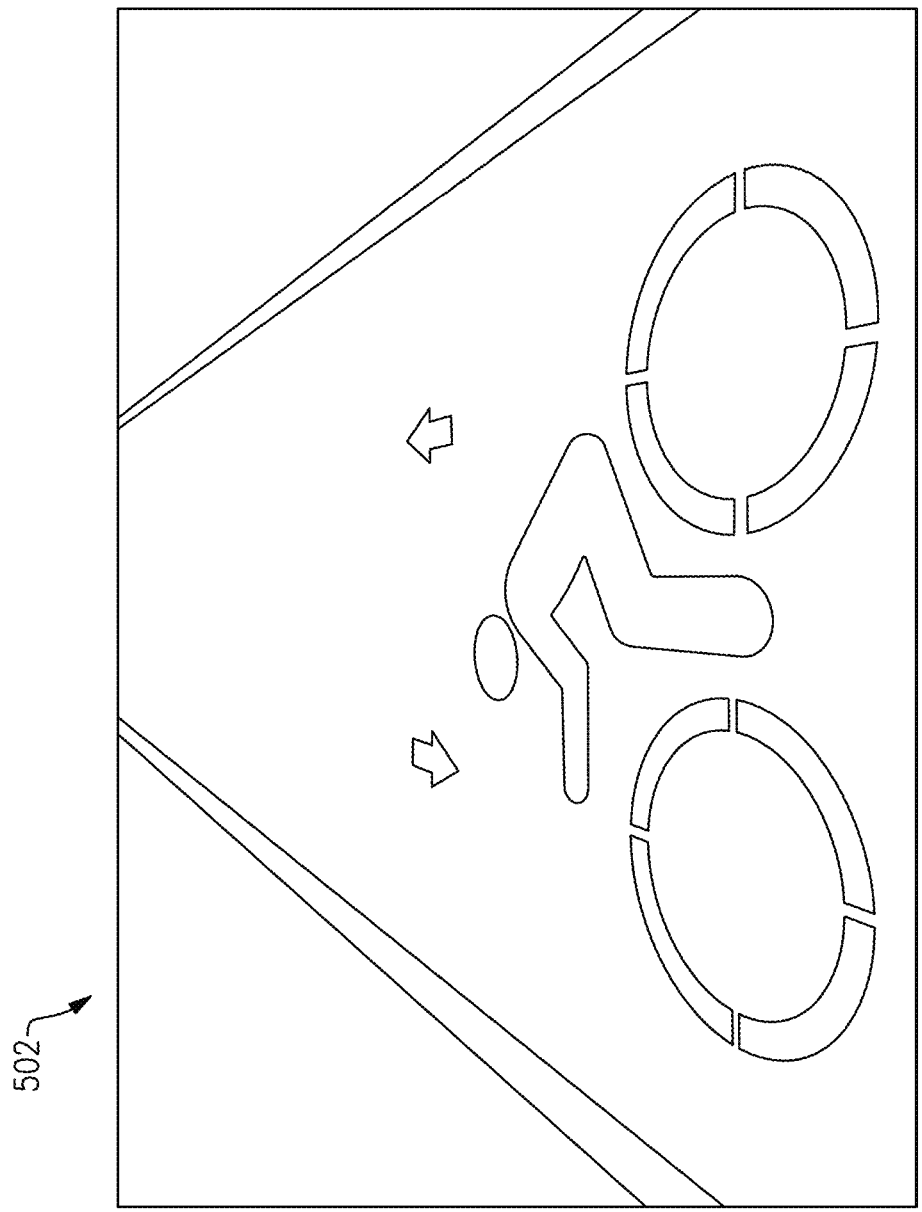
FIG. 4 is an example image of a roadway including ground painting in accordance with aspects of this disclosure.

FIG. 4 is an example image of a roadway including ground painting 502 in accordance with aspects of this disclosure. In the event that one of the sensors 144 detects the ground painting 502 illustrated in FIG. 4, the map update subsystem 300 may determine that an associated lane is a bike lane. In the event that the ground painting 502 is within a lane that was not present within the navigational map 312, the map updating block 435 is able to update the navigational map 312 by identifying the new lane as a bike lane. The map update subsystem 300 may also be able to make other inferences based on determining that the lane is a bike lane, for example, a bike lane may be highly likely to have solid lines on either side. Thus, in some embodiments, the ground painting mapping block 430 may further have more confidence that lines detected on either side of the bike lane are solid lines in response to detecting the ground painting 502 indicating that the lane is a bike lane.

Figure 5:
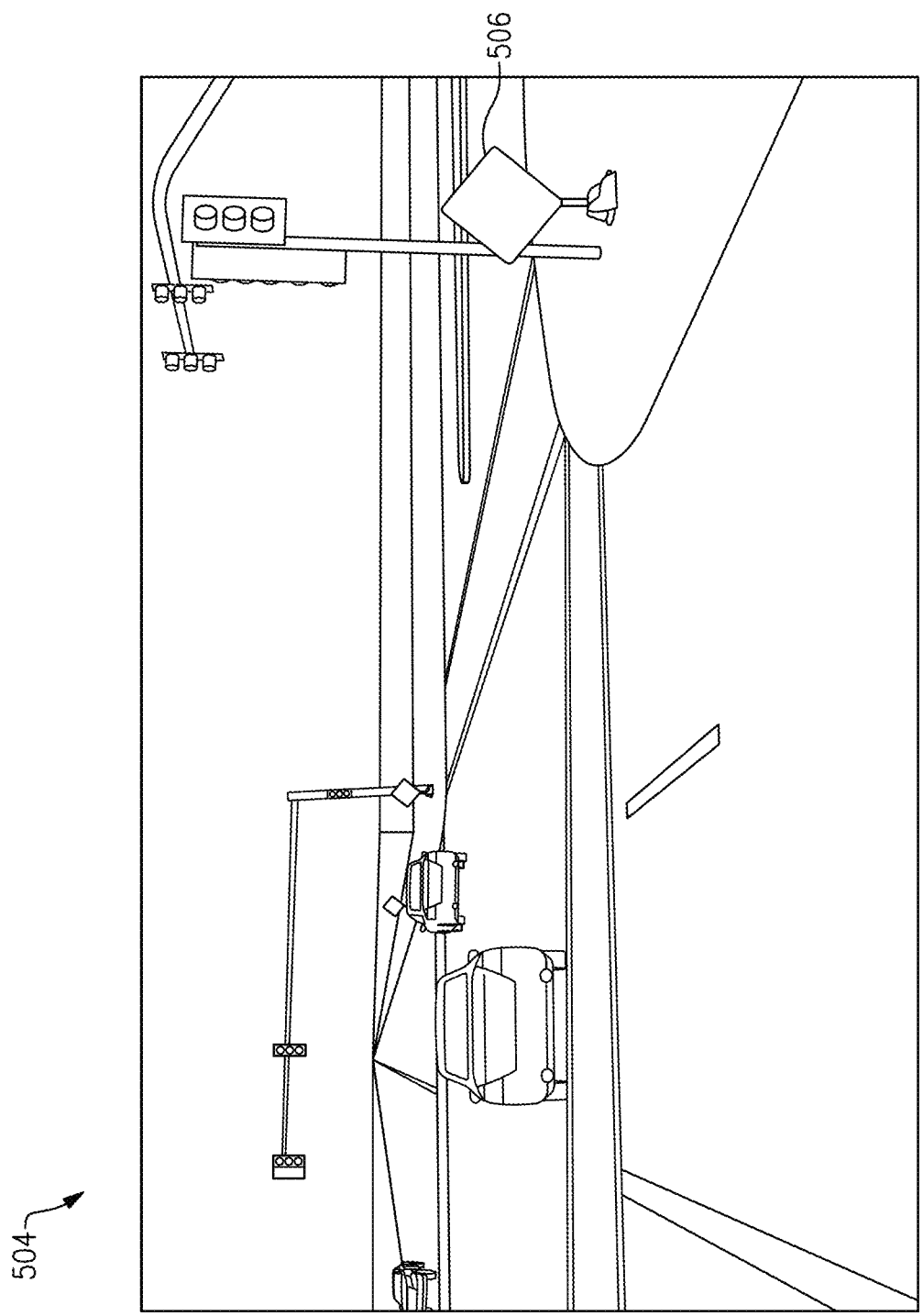
FIG. 5 is an example image of a driving environment having temporary signage in accordance with aspects of this disclosure.

FIG. 5 is an example image of a driving environment 504 having temporary signage 506 in accordance with aspects of this disclosure. For example, the anomaly detector 412 may detect an inconsistency when at least one of the sensors of the vehicle sensor subsystem 144 detects the temporary signage 506 and the temporary signage is not present in the navigational map 312. In the example of FIG. 5, the map update subsystem 300 may further be configured to determine that the temporary signage 506 is indicative of construction further ahead along the roadway, and thus, may represent an increased likelihood of anomalies as the autonomous vehicle 105 continues along the roadway. The map update subsystem 300 may reduce the threshold number of inconsistencies required to trigger the real-time mapping block 422 when the map update subsystem 300 determines that there is an increased likelihood of anomalies along the roadway. In certain implementations, the reduced threshold number of inconsistencies may be maintained for a predetermined length of time and/or for a predetermined distance travelled by the autonomous vehicle 105.

In addition to adjusting the threshold number of inconsistencies, the map update subsystem 300 can also use the detected road work sign to increase the probability of a change in the speed limit since construction zone often have temporary speed limits. In addition, the map update subsystem 300 can also increase the probability of detecting the presence of traffic cones which denote temporary lanes when a construction zone is detected.

Figure 6:
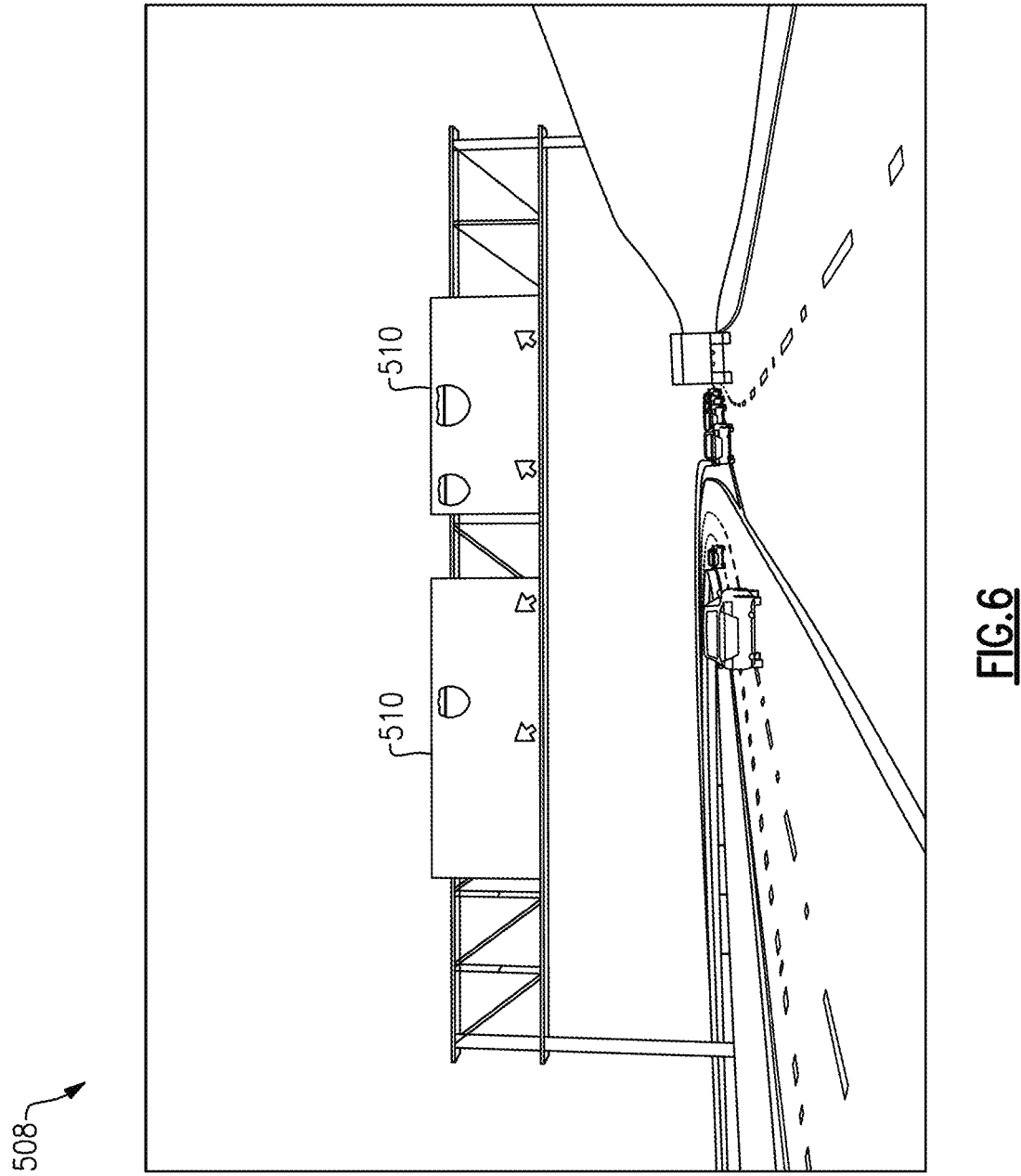
FIG. 6 is an example image of another driving environment having signage in accordance with aspects of this disclosure.

FIG. 6 is an example image of another driving environment 508 having signage 510 in accordance with aspects of this disclosure. In the illustrated example, the signage 510 may indicate which of a plurality of lanes will continue along the current roadway and which lane(s) correspond to an exit, and thus, will not continue along the current roadway. When the current roadway is not included in the navigational map 312, the map update subsystem 300 can detect the signage 510 via one or more of the sensors of the vehicle sensor subsystem 144 and determine which of the lanes will continue along the current roadway and which of the lane(s) will exit from the current roadway. This information can be used by the lane mapping block 424 of the real-time mapping block 422 in order to map the lanes of the roadway.

Figure 7:
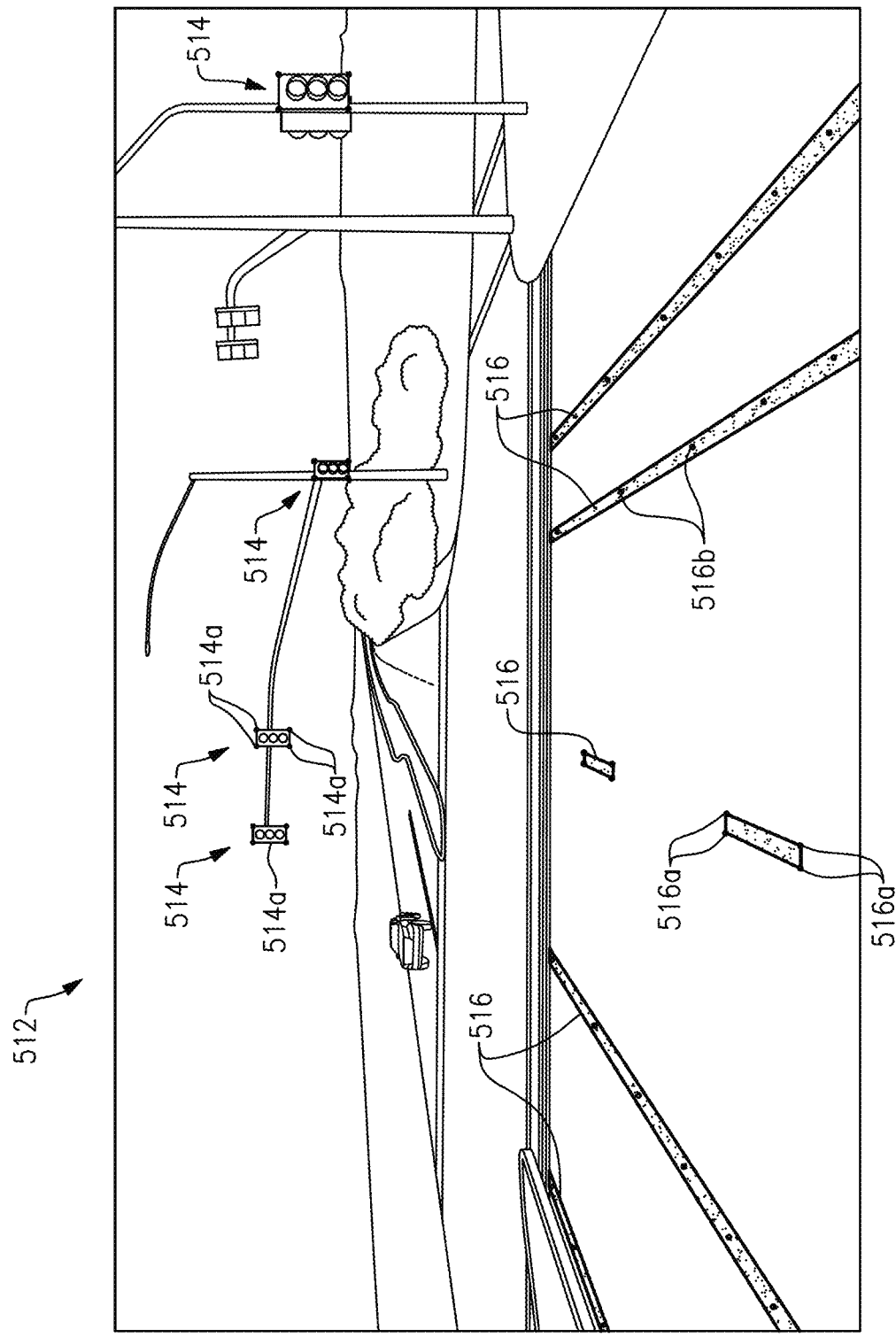
FIG. 7 is an example image of yet another driving environment including output from one or more of the sensors overlaid on the image.

FIG. 7 is an example image of yet another driving environment 512 including output from one or more of the sensors of the vehicle sensor subsystem 144 overlaid on the image. In the illustrated image, the outputs of the sensors of the vehicle sensor subsystem 144 include detected traffic lights 514 and detected roadway lines 516. The detected traffic lights 514 may be identified with bounding boxes 514a as well as corner indicators 514b. Similarly, the roadway lines 516 may be identified with lines as well as corner indicators 516a (e.g., in the case of a broken line) and/or center indicators 516b (e.g., in the case of a solid line). For simplicity, only a subset of the bounding boxes 514a, corner indicators 514b and 516a, and center indicators 516b are provided with reference numerals in FIG. 7.

The map update subsystem 300 can use detected traffic lights 514 and/or the detected roadway lines 516 to infer the location(s) of other object(s) within the driving environment 512. For example, the roadway lines 516 can be determined as the boundaries for one or more lanes within the driving environment 512. The traffic light 514 on the right side of the image can be used to determine the location of a stopping line at which the autonomous vehicle 105 must stop when the traffic lights 514 are red.

Figure 8:
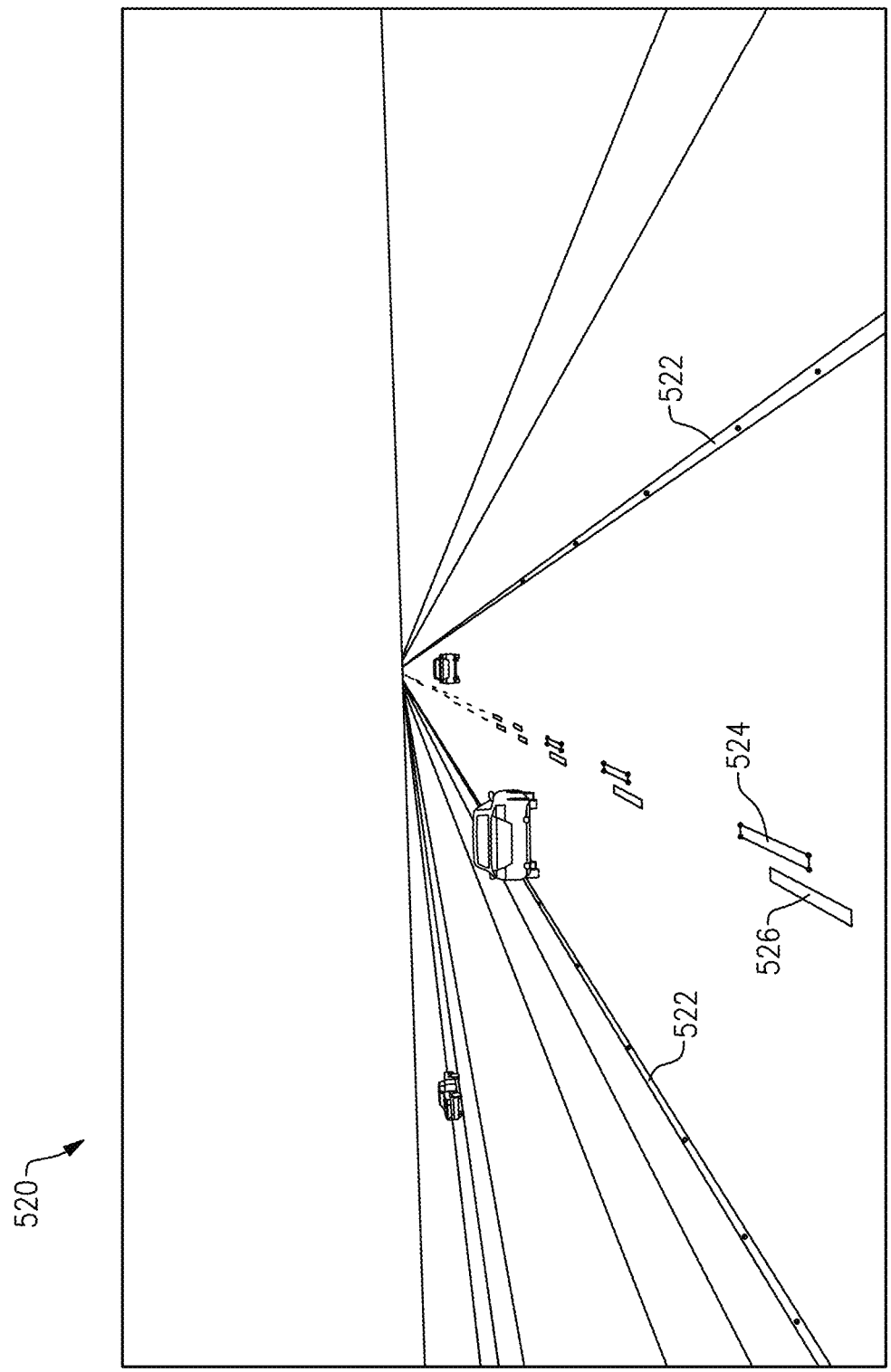
FIG. 8 is an example image of still yet another driving environment including an example of a calibration inconsistency with may be detected by the calibration inconsistency detector in accordance with aspects of this disclosure.

FIG. 8 is an example image of still yet another driving environment 520 including an example of a calibration inconsistency with may be detected by the calibration inconsistency detector 416 in accordance with aspects of this disclosure. As shown in FIG. 8, the output of the sensors of the vehicle sensor subsystem 144 includes detected solid lines 522 and two separate detected broken lines 524 and 526, which may represent the output of two different sensor of the vehicle sensor subsystem 144 types. When the locations of the detected broken lines 524 and 526 do not overlap in a consistent manner, the calibration inconsistency detector 416 may identify a calibration inconsistency which may not be indicative of an inconsistency in the navigational map 312.

Figure 9:
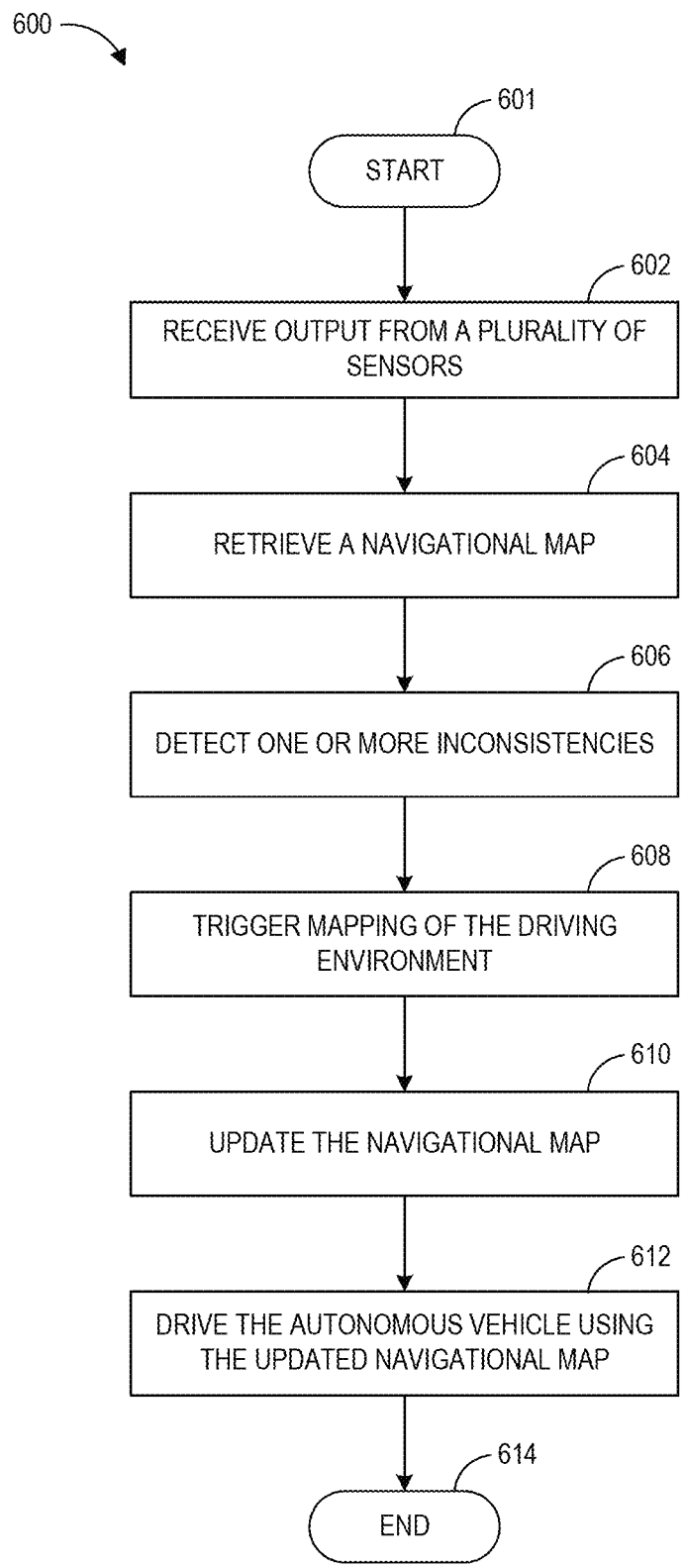
FIG. 9 illustrates an example method for updating a navigational map in accordance with aspects of this disclosure.

FIG. 9 illustrates an example method 600 for updating a navigational map in accordance with aspects of this disclosure. In some implementations, certain blocks of the method 600 may be performed by the map update subsystem 300, or any other module executed by a processor on the autonomous vehicle 105 or the network resources 122. For simplicity, the method 600 will be described as performed by the map update subsystem 300.

The method 600 begins at block 601. At block 602, the map update subsystem 300 receives output from a plurality of sensors of the vehicle sensor subsystem 144 located on an autonomous vehicle 105 indicative of a driving environment of the autonomous vehicle 105. At block 604, the map update subsystem 300 retrieves a navigational map 312 used for driving the autonomous vehicle 105.

At block 606, the map update subsystem 300 detects one or more inconsistencies between the output of the sensors of the vehicle sensor subsystem 144 and the navigational map 312. At block 608, in response to detecting the one or more inconsistencies, the map update subsystem 300 triggers mapping of the driving environment based on the output of the sensors of the vehicle sensor subsystem 144. At block 610, the map update subsystem 300 updates the navigational map 312 based on the mapped driving environment. At block 612, the map update subsystem 300 drives the autonomous vehicle 105 using the updated navigational map 312. The method 600 ends at block 614.

As described herein, aspects of this disclosure relate to systems and methods for updating a navigational map, which includes at least two parts in a pipeline, detection which is based on deep/machine learning method and sensor fusion, and parameter extraction which extracts road objects enclosing semantic, geometric, and geographic information from time-series.

Aspects of this disclosure provide a general and scalable platform for automatic detection and extraction of all types of road objects, which can be provided in centimeter-level accuracy from heterogeneous sensor data.

What is claimed is:

1. An autonomous vehicle comprising:
   at least one sensor configured to generate output indicative of a driving environment of the autonomous vehicle;
   a processor; and
   a computer-readable memory in communication with the processor and having stored thereon a navigational map and computer-executable instructions to cause the processor to:
   access the output from the at least one sensor,
   access the navigational map,
   detect one or more inconsistencies between the output of the at least one sensor and the navigational map,
   determine that there is an increased likelihood of anomalies along a roadway based on the output of the at least one sensor,
   reduce a threshold number of inconsistencies that trigger mapping of the driving environment in response to determining that there is the increased likelihood of anomalies along the roadway,
   in response to determining that a number of the one or more inconsistencies is greater than the threshold number of inconsistencies, trigger the mapping of the driving environment based on the output of the at least one sensor,
   update the navigational map based on the mapped driving environment, and
   navigate the autonomous vehicle using the updated navigational map.

2. The autonomous vehicle of claim 1, wherein the memory further has stored thereon computer-executable instructions to cause the processor to:
   detect and extract a first high-definition road object element from the output of the at least one sensor,
   wherein the detecting of the one or more inconsistencies comprises comparing the first high-definition road object element with a second high-definition road object element included in the navigational map.

3. The autonomous vehicle of claim 1, wherein the detecting of the one or more inconsistencies is performed using an anomaly detection module and the mapping of the driving environment is performed using a real-time mapping module, and wherein the real-time mapping module is more computationally intensive than the anomaly detection module.

4. The autonomous vehicle of claim 1, wherein the memory further has stored thereon computer-executable instructions to cause the processor to:
   refrain from triggering the mapping of the driving environment in response to the number of the one or more inconsistencies being less than the threshold number of inconsistencies; and
   navigate the autonomous vehicle using the navigational map.

5. The autonomous vehicle of claim 1, wherein the memory further has stored thereon computer-executable instructions to cause the processor to detect one or more calibration inconsistencies in the output of the at least one sensor.

6. The autonomous vehicle of claim 5, wherein the memory further has stored thereon computer-executable instructions to cause the processor to:
   determine that the one or more inconsistencies are due to the one or more calibration inconsistencies; and
   refrain from triggering the mapping of the driving environment in response to the determination that the one or more inconsistencies are due to the one or more calibration inconsistencies.

7. The autonomous vehicle of claim 1, wherein the memory further has stored thereon computer-executable instructions to cause the processor to determine whether the mapping of the driving environment has generated sufficient new map data for the updating of the navigational map.

8. The autonomous vehicle of claim 7, wherein the determination of whether the mapping of the driving environment has generated sufficient new map data comprises:
   determining a first parameter related to a consistency between the new map data and the navigational map; and
   determining a second parameter related to whether the new map data provides sufficient drivable space for the autonomous vehicle.

9. The autonomous vehicle of claim 8, wherein the determination of whether the mapping of the driving environment has generated sufficient new map data comprises:
   comparing the first parameter to a first parameter threshold;
   comparing the second parameter to a second parameter threshold; and
   determining that the mapping of the driving environment has generated the sufficient new map data in response to the first parameter being greater than the first parameter threshold and the second parameter being greater than the second parameter threshold.

10. The autonomous vehicle of claim 9, wherein the determination of whether the mapping of the driving environment has generated sufficient new map data comprises:
determining that the mapping of the driving environment has not generated the sufficient new map data in response to at least one of: the first parameter being less than the first parameter threshold and the second parameter being less than the second parameter threshold; and
continuing the mapping of the driving environment based on the output of the at least one sensor in response to the determining that the mapping of the driving environment has not generated the sufficient new map data.

11. The autonomous vehicle of claim 7, wherein the memory further has stored thereon computer-executable instructions to cause the processor to generate a minimum risk conditions (MRC) signal in response to determining that the mapping of the driving environment has not generated the sufficient new map data for the updating of the navigational map.

12. The autonomous vehicle of claim 1, wherein the threshold number of inconsistencies required to trigger the mapping of the driving environment is reduced for a predetermined distance travelled by the autonomous vehicle.

13. A non-transitory computer readable storage medium having stored thereon instructions that, when executed, cause at least one computing device to:
access output from at least one sensor located on an autonomous vehicle indicative of a driving environment of the autonomous vehicle;
access a navigational map from a computer-readable memory of the autonomous vehicle;
detect one or more inconsistencies between the output of the at least one sensor and the navigational map;
determine that there is an increased likelihood of anomalies along a roadway based on the output of the at least one sensor;
reduce a threshold number of inconsistencies that trigger mapping of the driving environment in response to determining that there is the increased likelihood of anomalies along the roadway;
in response to determining that a number of the one or more inconsistencies is greater than the threshold number of inconsistencies, trigger the mapping of the driving environment based on the output of the at least one sensor;
update the navigational map based on the mapped driving environment; and
navigate the autonomous vehicle using the updated navigational map.

14. The non-transitory computer readable storage medium of claim 13, wherein the updating of the navigational map comprises deleting one or more objects from the navigational map that correspond to the one or more inconsistencies.

15. The non-transitory computer readable storage medium of claim 13, further having stored thereon instructions that, when executed, cause the at least one computing device to provide the updated navigational map to other autonomous vehicles over the air.

16. The non-transitory computer readable storage medium of claim 13, further having stored thereon instructions that, when executed, cause the at least one computing device to:
identify a sign indicative of construction ahead of the autonomous vehicle; and
reduce the threshold number of inconsistencies required to trigger the mapping of the driving environment in response to identifying the sign indicative of construction.

17. The non-transitory computer readable storage medium of claim 16, wherein the threshold number of inconsistencies required to trigger the mapping of the driving environment is reduced for a predetermined length of time.

18. A method comprising:
accessing output from at least one sensor located on an autonomous vehicle indicative of a driving environment of the autonomous vehicle;
accessing a navigational map from a computer-readable memory of the autonomous vehicle;
detecting one or more inconsistencies between the output of the at least one sensor and the navigational map;
determining that there is an increased likelihood of anomalies along a roadway based on the output of the at least one sensor;
reducing a threshold number of inconsistencies that trigger mapping of the driving environment in response to determining that there is the increased likelihood of anomalies along the roadway;
in response to determining that a number of the one or more inconsistencies is greater than the threshold number of inconsistencies, triggering the mapping of the driving environment based on the output of the at least one sensor;
updating the navigational map based on the mapped driving environment; and
navigating the autonomous vehicle using the updated navigational map.

19. The method of claim 18, further comprising:
detecting a traffic light based on the output of the at least one sensor; and
determining a location of a stopping line based on the detected traffic light.

* * * * *